United States Patent [19]

Kono et al.

[11] 4,007,440
[45] Feb. 8, 1977

[54] APPARATUS FOR RECOGNITION OF APPROXIMATE SHAPE OF AN ARTICLE

[75] Inventors: Hidehiko Kono, Akishima; Masayo Oka, Fujisawa; Sadakazu Kawamura, Tachikawa, all of Japan

[73] Assignees: Agency of Industrial Science & Technology; Ikegami Tsushinki Co., Ltd.; Hitachi Denshi Kabushiki Kaisha, all of Tokyo, Japan

[22] Filed: Jan. 28, 1976

[21] Appl. No.: 653,216

[30] Foreign Application Priority Data

Jan. 30, 1975  Japan .............................. 50-12885
Jan. 23, 1976  Japan .............................. 51-6399

[52] U.S. Cl. .................................... 340/146.3 AC
[51] Int. Cl.² ........................................ G06K 9/00
[58] Field of Search .......... 340/146.3 Q, 146.3 AC; 235/151.3

[56] References Cited

UNITED STATES PATENTS

| 3,432,674 | 3/1969 | Hobrough | 340/146.3 Q |
| 3,614,736 | 10/1971 | McLaughlin et al. | 340/146.3 Q |
| 3,846,755 | 11/1974 | Hart | 340/146.3 AC |

*Primary Examiner*—Joseph M. Thesz
*Attorney, Agent, or Firm*—Oblon, Fisher, Spivak, McClelland & Maier

[57] ABSTRACT

Recognition of the approximate shape of a given article is accomplished by rotating the article by an angle of 180° for thereby producing a direct projection, moving this direct projection perpendicularly onto a reference line for thereby obtaining a perpendicular projection of the article, computing the average pattern-classification value and the range of variation of pattern-classification value from the maximum and minimum ratios of the product of the largest width of the perpendicular projection of that article multiplied by the largest height thereof to the area of the article, and comparing the average pattern-classification value and the variable range with those of the reference pattern.

17 Claims, 15 Drawing Figures

Fig._1
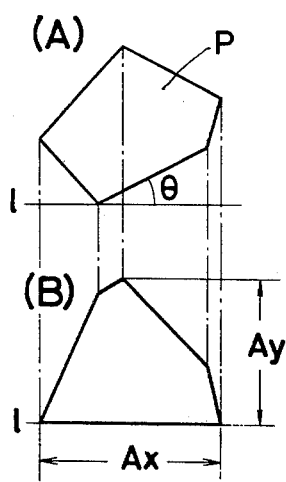
Fig._2
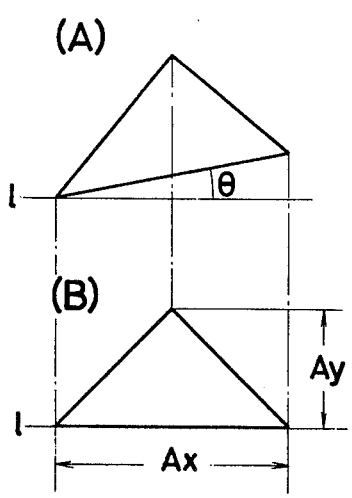
Fig._3
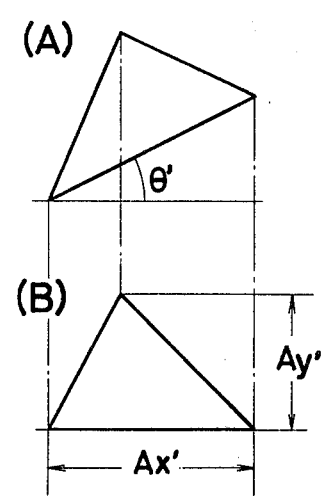
Fig._4
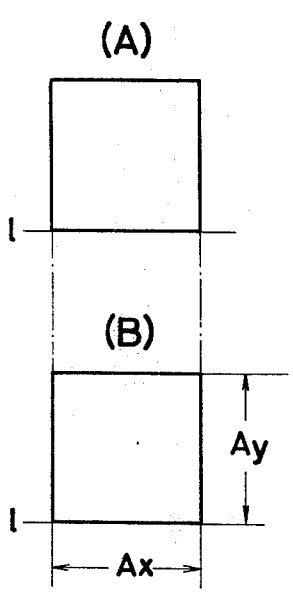
Fig._5
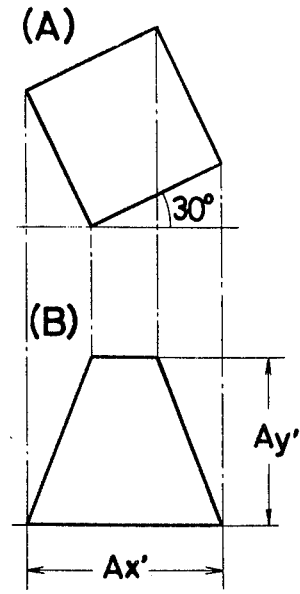
Fig._6
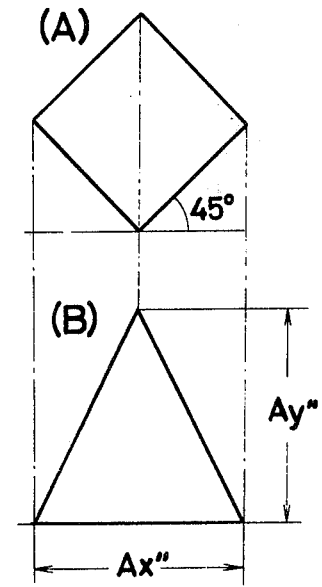

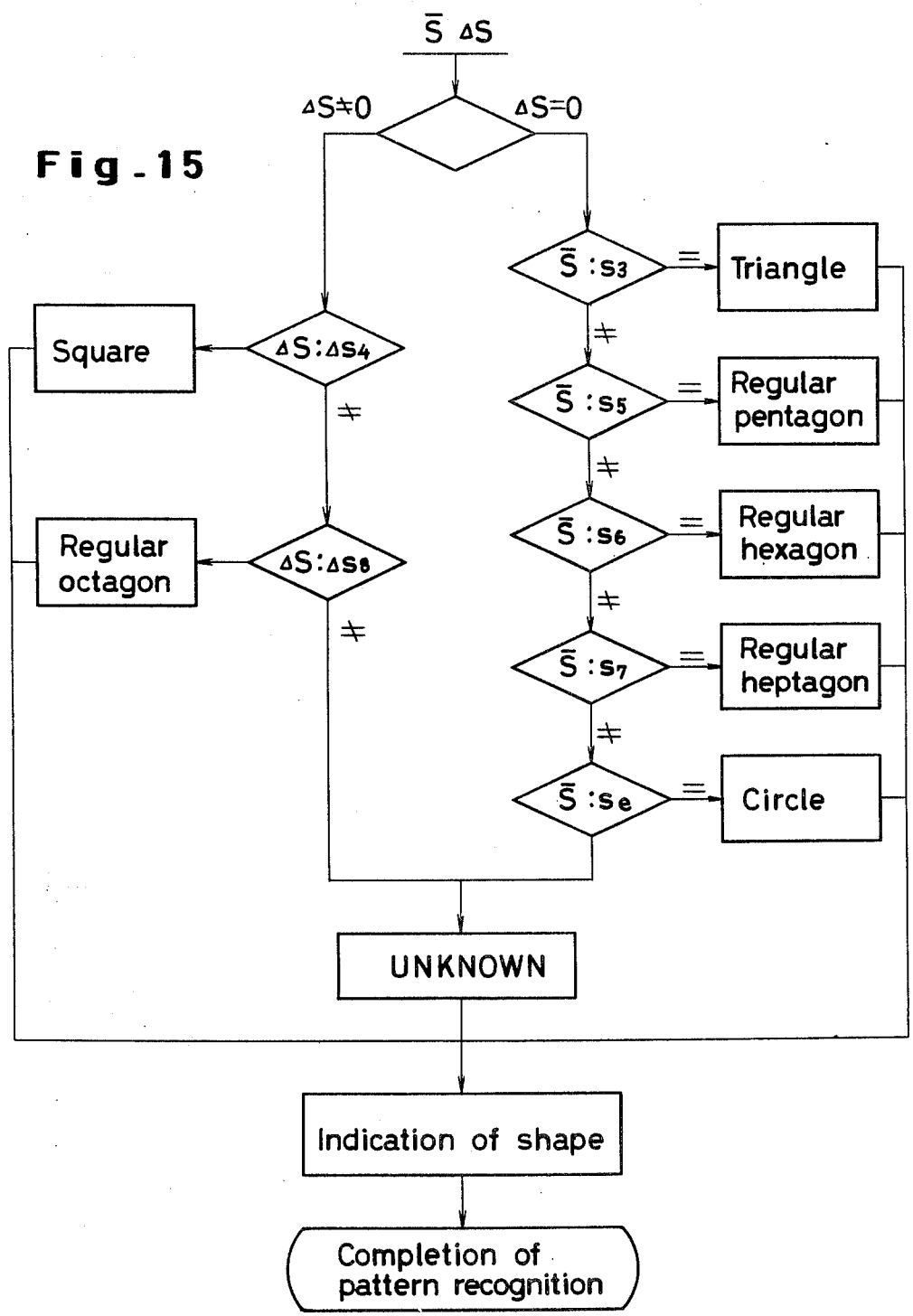

APPARATUS FOR RECOGNITION OF APPROXIMATE SHAPE OF AN ARTICLE

This invention relates to an apparatus for the recognition of the shape of an article. More particularly, the present invention relates to an apparatus for pattern recognition, which effects the recognition of the approximate shape of an article to be recognized by the degree of similarity of the shape of said article to a reference pattern.

For the purpose of sorting and classifying industrial parts, packages, containers, etc., these articles upon rough, general observation may be regarded as possessing quite simple shapes. When these articles are closely observed, however, their shapes are in many cases too complicated for them to be recognized by a pattern recognizing apparatus. In spite of the fact that exact recognition of complicated shapes may not be practicable, desired sorting and classification of such articles can be obtained through recognition of the approximate shapes thereof. These articles generally do not have simple geometric shapes such as triangles, equilateral hexagons and circles. It is, therefore, advantageous to effect the sorting and classification of articles through recognition of the approximate shapes of said articles.

Heretofore the pattern recognition of a given article has been accomplished by obtaining an outline of the shape of the article, converting the outline into very short line segments, calculating the contour function from these line elements by the minimum square method and determining the shape of the object from the contour function.

For pattern recognition of articles which have simple geometric shapes or shapes similar thereto, there has been suggested a method whereby the reconginition of the shape of a given article is accomplished on the basis of the number of maximum and minimum projection values determinable by measuring side-to-side distances in a figure obtained by projecting the article as it is rotated by 180° and subsequently calculating a projection characteristic of the shape. According to this method, however, the rotation by 180° must be about the center of the article. In the case of equilateral triangles and regular hexagons, the characteristic curves determined by this method are identical, so that distinction between these figures is difficult. Accordingly, the shapes distinguishable by this method are limited.

As an improvement over the method for pattern recognition described above, there has been suggested a method which accomplishes pattern recognition on the basis of a decision reached from the comparison of the characteristic of projection values of an article subjected to pattern recognition with that of projection values of reference patterns memorized in advance.

According to this method, however, where the prospective articles for pattern recognition have a rich variety of shapes, the memorized reference pattern data must be much in volume so that the operation of comparison and decision become complicated and a large system is required. Besides, this method has a serious disadvantage that it fails to provide desired pattern recognition where the characteristic of projection values of the article differs, though very slightly, from that of projection values of the reference pattern, even if the article and the reference pattern resemble each other very much in appearance.

An object of the present invention is to provide an apparatus for recognizing the approximate shape of an article subjected to pattern recognition, which even in the absence of conformity between the article and the reference pattern accomplishes said pattern recognition on the basis of the degree of similarity found between the article and the reference pattern.

To attain the object described above according to the present invention, there is provided a method for the recognition of the approximate shape of an article, which comprises finding from the projection of said article the largest width, the largest height and the area of the article relative to a reference line, finding a pattern-classification value obtainable from the ratio of the area found to the product of said largest width multiplied by said largest height by rotating the postural angle of the article by 180°, calculating the average value and the maximum variable range from the pattern-classification value measured in consequence of said 180° rotation, integrally comparing the resulting average pattern-classification value and maximum variable range with the average pattern-classification values and maximum variable ranges of a desired number of reference patterns and consequently determining the degree of similarity of the shape with the relevant reference pattern.

Even when the article subjected to pattern recognition fails to conform with the reference pattern, the method of this invention permits recognition of the approximate shape of that article because the degree of similarity of that object to each of the reference patterns is recognizable. Furthermore, the only reference pattern data which need be memorized are the average pattern-classification values and maximum variable ranges. A compact system, therefore, will suffice for this method and the operation of the system is simple.

Other objects and characteristic features of the present invention will become apparent from the description given in full detail hereinbelow with reference to the accompanying drawing.

FIGS. 1 through 6 are explanatory views showing how pattern-classification values are obtained according to the present invention;

FIG. 15 is a block diagram of another circuit for performing pattern recognition in accordance with the present invention.

Figure 7:
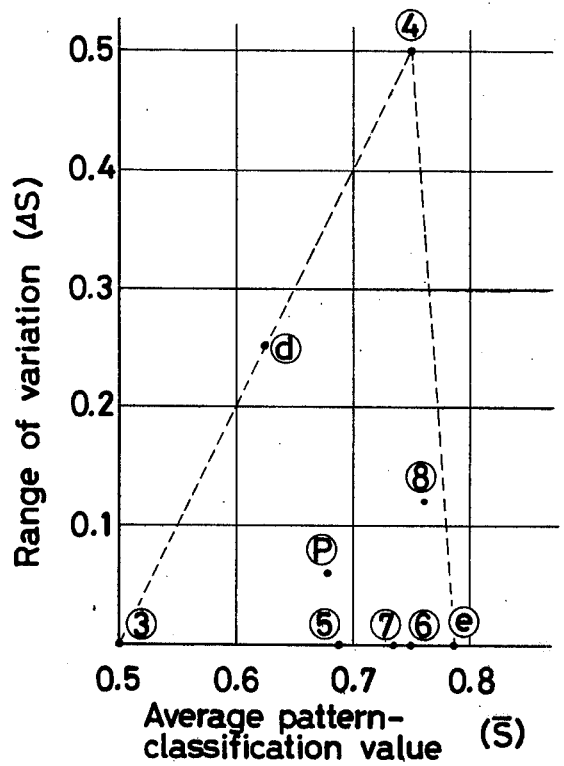
FIG. 7 is a coordinate system wherein the loci of reference patterns are plotted according to the present invention.

With reference to the drawing, particularly to FIG. 1, when an object P subjected to pattern recognition is projected with one side of the projection falling at an arbitrary angle of θ relative to the reference line $l$, there is obtained a direct projection as illustrated in FIG. 1(A). When this projection representing the shape of the article is moved perpendicularly onto the reference line $l$, it assumes a shape as illustrated in FIG. 1(B). In the perpendicular projection of the article obtained on the reference line $l$ as described above, let $Ax$ stand for the largest width on said reference line $l$, $Ay$ stand for the largest height from said reference line $l$ and $A$ stand for the area of the perpendicular projection. Consider the ratio of the area $A$ to the product of the largest width $Ax$ multiplied by the largest height $Ay$ (which ratio will be referred to hereinafter as the "pattern-classification value"). The values assumed by this classification value as the postural angle θ of the article relative to the reference line $l$ is changed in the range of from 0° to 180° have been found to have a specific relationship with the shape of that article. Specifically, the pattern-classification value S is expressed by the following formula:

$$S = \frac{A}{Ax \times Ay} \quad (1)$$

In the case of an article whose shape is a triangle, the projection on reference line $l$ is a triangle for all values of θ. Therefore, if the postural angle of this article relative to the reference line $l$ is changed from that shown in FIG. 2(A) to that shown in FIG. 2(B), the area of the projection on line $l$ is always one half the product of the largest width Ax multiplied by the largest height Ay. This means that the pattern-classification value S for any article of triangular shape is 0.5. Next consider the case of an article whose shape is a quadrangle. For easy understanding, an explanation will be given for a square. If one of the four sides of the square is coincident with the reference line $l$ as illustrated in FIG. 4(A), then the corresponding perpendicular projection will have an identical shape as shown in FIG. 4(B). The pattern-classification value of the square, therefore, is 1.0. If the postural angle of this square relative to the reference line is 30° as illustrated in FIG. 5(A), however, the corresponding perpendicular projection will have the shape of a trapezoid having two equal sides as illustrated in FIG. 5(B). The pattern-classification value S in this case, therefore, will be $$\frac{3 - \sqrt{3}}{2}$$

or about 0.634. If the postural angle of this square increases to 45° as illustrated in FIG. 6(A), then the corresponding perpendicular projection will have the shape of a triangle as shown in FIG. 6(B) and the pattern-classification value S will become 0.5. As indicated above, the pattern-classification value S is variable in the range of from 0.5 to 1.0 in the case of a square. For squares, therefore, the pattern-classification value is 0.75 which is the average of said maximum and minimum values and the maximum variable range of this value is 0.5. In the case of an article whose shape is a circle, the largest width $Ax$, the largest height $Ay$ and the area $A$ of the shape are the same at all times without reference to the posture of the article. The pattern-classification value S for any article having the shape of a circle is invariably π/4 or about 0.785. Other shapes such as regular pentagons, regular hexagons, regular heptagons and regular octagons, therefore, each have their own pattern-classification values. Table 1 shows pattern-classification values S of such geometric shapes and the corresponding maximum variable ranges.

Table 1

| Shape of article | Pattern-classification value (S) | Average of pattern-classification value (S) | Maximum range of variation of pattern-classification value (ΔS) |
|---|---|---|---|
| Triangle | 0.5 | 0.5 | 0 |
| Square (including rhombus) | 0.5 – 1.0 | 0.75 | 0.5 |
| Regular pentagon | 0.691 | 0.691 | 0 |
| Regular hexagon | 0.75 | 0.75 | 0 |
| Regular heptagon | 0.738 | 0.738 | 0 |
| Regular octagon | 0.706 – 0.826 | 0.766 | 0.12 |
| Circle | 0.786 | 0.786 | 0 |

As is evident from the foregoing table, each shapes has a pattern-classification value (S) of its own.

By plotting the data of Table 1 in the $\overline{S}$ - Δ S coordinate system in which the vertical axis is graduated for the maximum range of variation (Δ S) of the various shapes and the horizontal axis for the average pattern-classification value ($\overline{S}$), there is obtained a coordinate system as illustrated in FIG. 7.

In FIG. 7, each circled numeral indicates the locus of the regular polygon having the number of sides indicated (except for that of the triangle which need not be regular, that of the square which is the same as that of the rhombus and that of the circle which is indicated by the circled (e). In the case of a triangle, for example, the pattern-classification value S is 0.5 and the range of variation Δ S thereof is 0. Accordingly, the locus is located at 0 on the ordinate and 0.5 on the abscissa. The locus of a square is located at 0.5 on the ordinate and 0.75 on the abscissa which is the average of the maximum and minimum (1.0 and 0.5 respectively) pattern-classification values. In the case of a trapezoid having two equal sides, with the ratio of the parallel sides being 1 : 2, the maximum of the pattern-classification value is 0.75 and the minimum thereof is 0.5. The locus, therefore, is located at 0.25 on the ordinate and 0.625 on the abscissa (point d in FIG. 7).

When these loci of the various shapes are plotted on the S - ΔS coordinate system, degree of similarity between two shapes can be expressed in terms of the distance between the corresponding loci, a shorter distance indicating a higher degree of similarity. For example, if the pattern-classification values are determined for the article whose projection is illustrated in FIG. 1, the maximum pattern-classification value is found to be 0.69 and the minimum thereof to be 0.63. The average $\overline{S}$ of the pattern-classification values is calculated to be 0.66 and the maximum range of variation thereof Δ S to be 0.06 respectively. The locus for this shape falls at the point P in FIG. 7, indicating that the shape of the article of FIG. 1 most resembles a regular pentagon and that the degree of similarity decreases gradually as the shape is compared with a regular pentagon, a regular heptagon and a regular hexagon.

Figure 8:
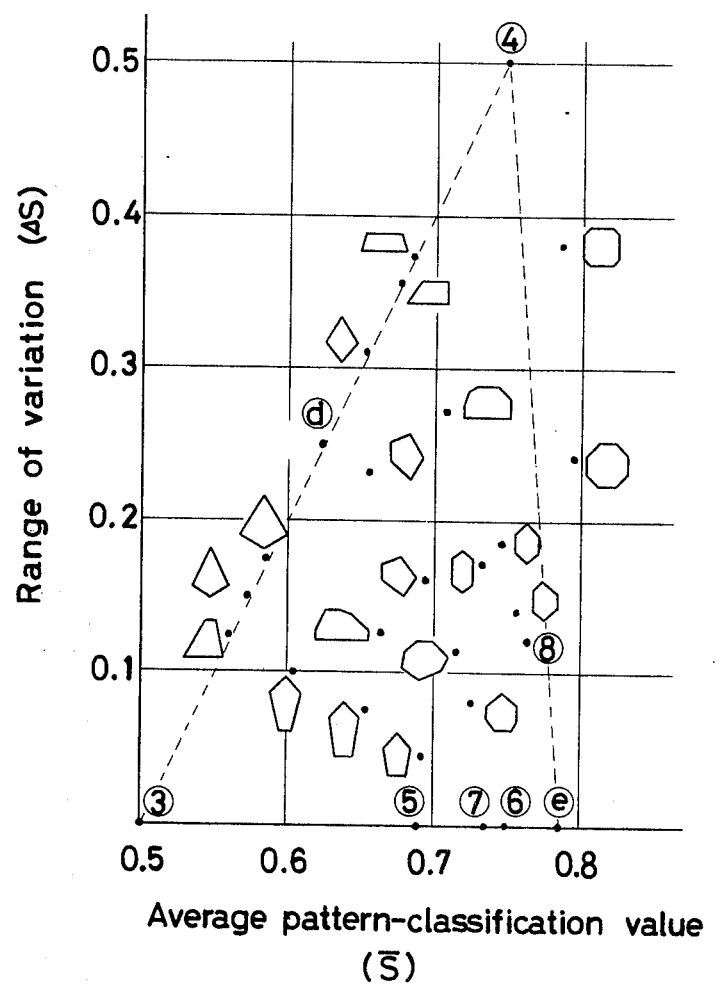
FIG. 8 is a coordinate system wherein the loci of various patterns are plotted according to the present invention.

The approximate shape of a given article can easily be recognized, as described above, by first finding the pattern-classification values of that article, plotting these values in the $\overline{S}$ - $\Delta S$ coordinate system and subsequently determining the degree of similarity of the shape of article to the reference pattern. By way of illustration, FIG. 8 shows the pattern-classification values obtained for articles of various shapes and plotted in the S - $\Delta$ S coordinate system. Through an explanation on the exact shapes of articles dealt with in FIG. 8 is omitted, the graph will readily permit one to estimate the degrees of similarity of the various articles to their respective reference patterns. Thus, desired recognition of approximate shapes of articles can be accomplished.

Figure 10:
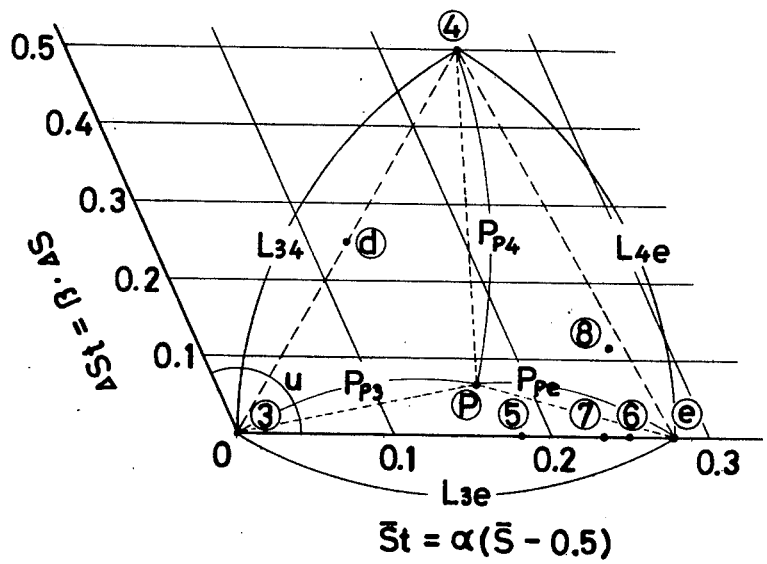

According to the representations of various shapes of articles in the coordinate system of FIG. 7 (or FIG. 8), a triangle for example is recognized to be a pattern having more similarity to a circle than to a square and a regular pentagon to be a pattern having more similarity to a circle than to a regular octagon. The recognition of similarity at times differs to some extent from the recognition of similarity by the human faculty. A survey conducted on this matter involving a number of ordinary adults has revealed, for example, that a triangle is considered to have greater similarity to a square to be recognized, for example, the reference patterns of triangle, square and circle are set at the apexes of a regular triangle and the abscissa $\overline{S}_t$ undergoes a conversion of $\alpha(\overline{S} - 0.5)$ and the ordinate $\Delta$ $S_t$ undergoes a conversion of $\beta \cdot \Delta S$ ($\alpha$ and $\beta$ being coefficients) as illustrated in FIG. 10. By subjecting the coordinates to the sense-filter conversion as described above, there is derived a criterion of judgment whereby absolutely no similarity exists among triangles, squares and circles. Consequently, recognition can clearly be obtained as to which one of the three reference patterns the article subjected to pattern has the highest degree of similarity.

Figure 11:
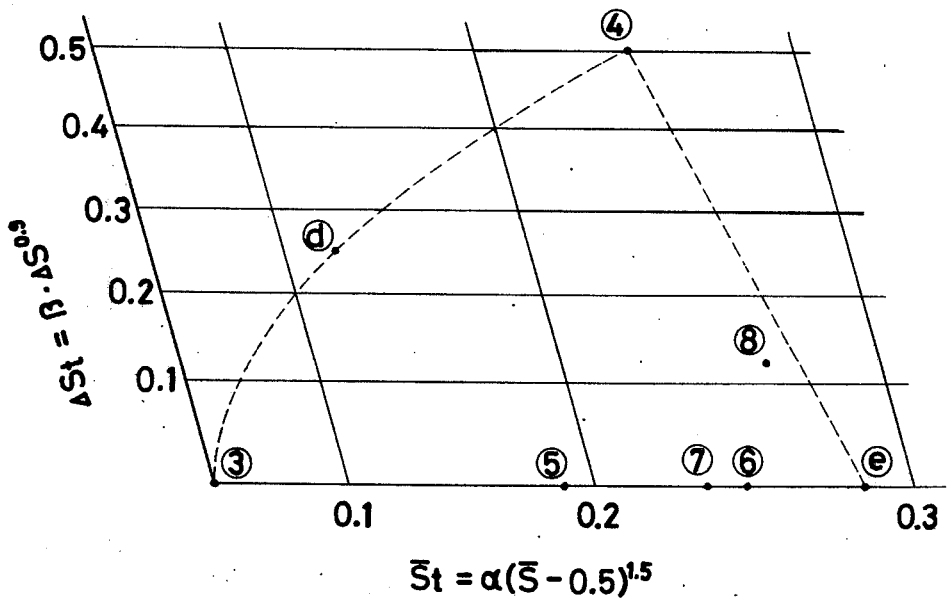

Analysis conducted on similarity between the shapes of articles involving a number of adults has revealed that the similarity between a triangle and a square is about 12%, the similarity between a triangle and a circle is about 3% and the similarity between a circle and a square is about 27%. FIG. 11 shows the coordinates resulting from the sense-fiter conversion carried out in accordance with the results of said analysis. In this case, the ordinate $\Delta St$ undergoes a conversion of $\alpha(\overline{S} - 0.5)^{1.5}$ and the abscissa St undergoes a conversion of $\beta \cdot \Delta S^{0.9}$ ($\alpha$ and $\beta$ being coefficients). The degree of similarity between the various articles have been computed from the coordinates resulting from the sense-filter conversion. The results are shown in Table 2.

Table 2

| | | Degree of similarity as sensed by the human beings (%) | | | | | | | |
|---|---|---|---|---|---|---|---|---|---|
| | | Triangle | Trapezoid | square | Regular pentagon | Regular hexagon | Regular heptagon | Regular octagon | Circle |
| Degree of Similarity by coordinate (%) | Triangle | | 58 | 12 | 48 | 26 | 18 | 10 | 3 |
| | Trapezoid | 61 | | 53 | 38 | 34 | 20 | 17 | 8 |
| | Square | 12 | 48 | | 41 | 46 | 35 | 50 | 27 |
| | Regular pentagon | 47 | 52 | 36 | | 88 | 80 | 62 | 55 |
| | Regular hexagon | 21 | 30 | 34 | 73 | | 92 | 82 | 76 |
| | Regular heptagon | 26 | 35 | 35 | 79 | 94 | | 92 | 85 |
| | Regular octagon | 17 | 34 | 49 | 66 | 82 | 81 | | 77 |
| | Circle | 3 | 15 | 27 | 56 | 82 | 77 | 77 | | than to a circle and that an octagon is most similar to a heptagon and least similar to a triangle.

Figure 9:
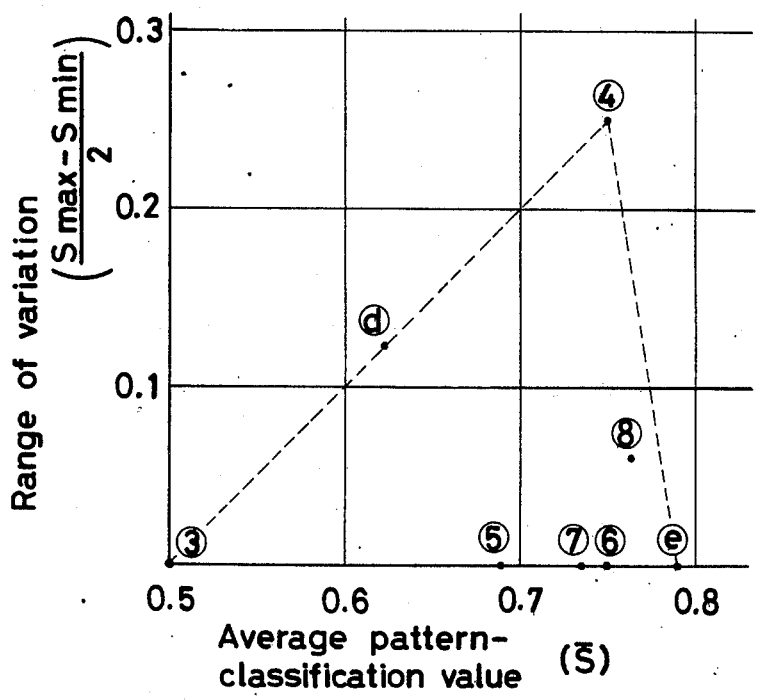
FIGS. 9 through 11 are coordinate systems obtained by converting the coordinate system of FIG. 7 by a sense filter according to the present invention.

When the range of variation $\Delta$ S of the pattern-classification values indicated as ordinates are assumed to be half the differences between the maxima and minima of the pattern-classification values, namely $\Delta$ S =

$$\Delta S = \frac{S_{max} - S_{min}}{2},$$

and they are plotted in the coordinate system, therefore, there is obtained a graph illustrated in FIG. 9. This projection, therefore, produces data which obviate the otherwise required sense-filter conversion to be dealt with afterward and approach images formed by the human being.

Where articles of a specific shape are desired to be recognized or where the recognition under discussion is desired to approach the recognition of the type proper to the human being the $\overline{S}$ - $\Delta$ S coordinates are subjected to sense-filter conversion. If the similarity of a given article to a triangle, a square or a circle is desired As is clear from the foregoing table, the similarity between a triangle and a pentagon, for example, is 48% according to the recognition by human beings as compared with 47% by the coordinate system. Thus, the degree of similarity obtained from the coordinate system is practically the same as that recognized by human beings.

The conversion of coordinates described above is intended to establish the degree of similarity between the various reference patterns and, therefore, establishes the attitude be involved during the recognition of similarity. That is to say, a person may establish a sense-filter to his own liking on the basis of his attitude in recognizing similarity and he can then effect the conversion of coordinates on the basis of said sense-filter. Thus, coordinates converted as desired to meet the requirements of the application concerned may be employed.

A decision is required as to which of the reference patterns the article subjected to pattern recognition bears similarity to. An explanation will be made as to this decision with reference to the coordinates of FIG. 10.

The average pattern-classification value S and the range of variation ΔS are found by measuring the article subjected to pattern recognition and the data thus obtained are plotted in the coordinate system (to determine the locus P). If, in the coordinate system, the degree of similarity between a triangle and a square is represented as $P_{34}$, that between a square and a circle is represented as $P_{4e}$ and that between a triangle and a circle is represented as $P_{3e}$, then the distances $L_{34}$, $L_{4e}$ and $L_{3e}$ between the indicated points of 3 and 4, 4 and e and 3 and e respectively on the plane of coordinates will be expresses as $P_{34} = P_{4e} = P_{3e} = 0$, because absolutely no similarity exists among the shapes of a triangle, a square and a circle as described above. Thus, the distance L which constitutes itself the criterion for the decision of similarity will be expressed as follows: $L = L_{34} = _{4e} = L_{3e}$. This means that 3, 4 and e having their positions at the apexes of regular triangle.

The degree of similarity $P_{ij}$ of the shape of an article subjected to pattern recognition to the various reference patterns is expressed by the following formula:

$$P_{ij} = \frac{L - L_{ij}}{L} \times 10 \quad (2)$$

wherein, the subscripts $i$ is the shape of the article subjected to pattern recognition and $j$ is the reference pattern involved in the pattern recognition.

Let $\overline{St}$ and $\Delta St$ stand for the coordinates of an article subjected to pattern recognition, and the distance to the coordinates (0, 0) of the triangle will be obtained in accordance with the formula (3).

$$P_{p3} = \frac{L - L_{3p}}{L} \times 10 \quad (3)$$

$$L_{3p} = \sqrt{\overline{St}^2 + \Delta St^2 - 2 \cdot \overline{St} \cdot \Delta St \cdot \cos u}$$

Also the distances to the coordinates (0.25, 0.5) of the square and to the coordinates (0.285, 0) of the circle are obtained in accordance with the formula (3) and the formula (4). By comparing the numerical values obtained, the degree of similarity of the article subjected to pattern recognition relative to the triangle, square and circle can be obtained.

$$P_{pe} = \frac{L - L_{pe}}{L} \times 10 \quad (4)$$

$$L_{pe} = \sqrt{(0.285 - \overline{St})^2 + \Delta St^2 - 2 \cdot (0.285 - \overline{St}) \cdot \Delta St \cdot \cos u}$$

$$P_{p4} = \frac{L - L_{p4}}{L} \times 10 \quad (5)$$

$$L_{p4} = \sqrt{(0.25 - \overline{St})^2 + (0.5 - \overline{St})^2 - 2 \cdot (0.25 - \overline{St}) \cdot (0.5 - \Delta St) \cos u}$$

The foregoing explanation has dealt with the determination of the degree of similarity of the shape of a given article to the shapes of the triangle, square and circle. It is possible to make a similar determination with respect to the degree of similarity to other reference patterns or in other $\overline{S}$ - $\Delta S$ coordinate systems.

Figure 12:
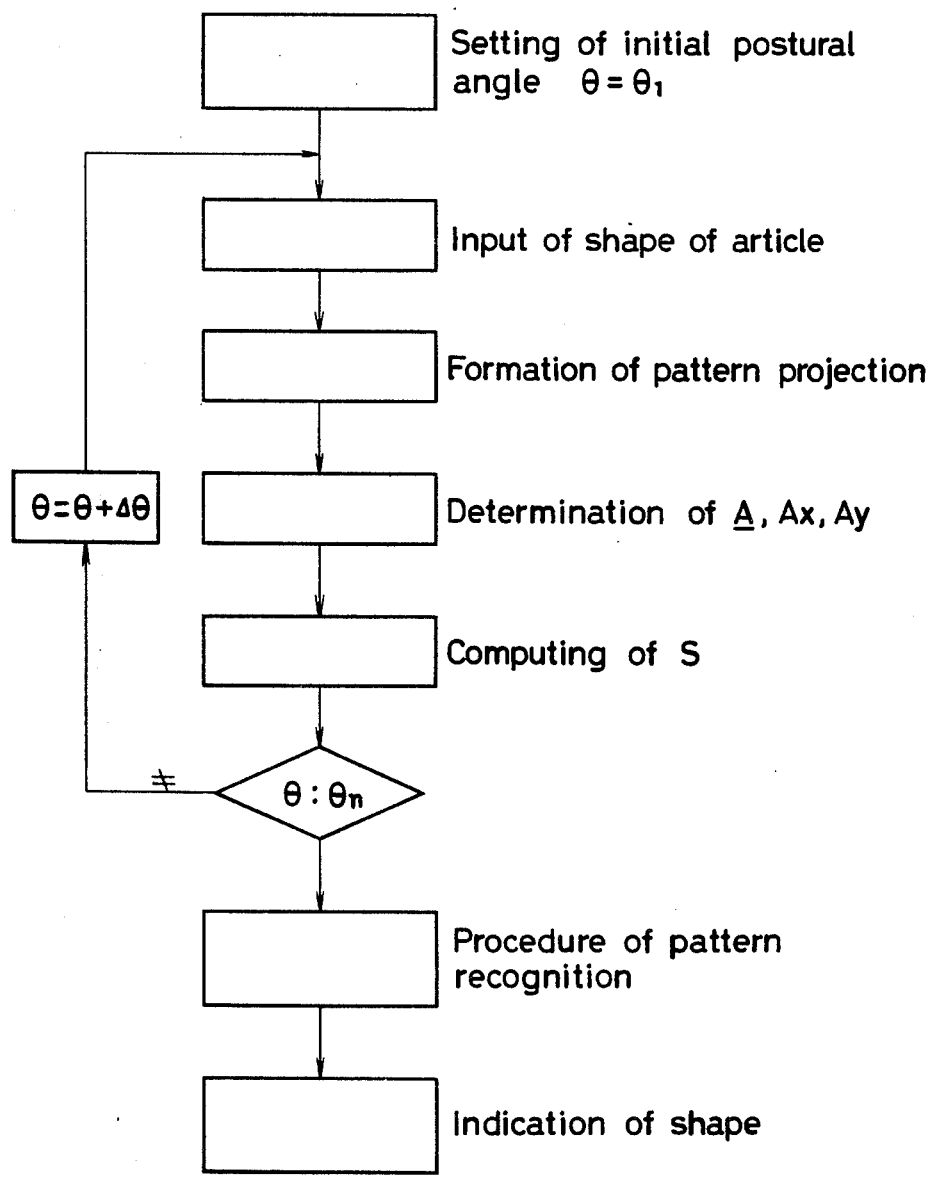
FIG. 12 is a block diagram of circuit for performing pattern recognition in accordance with the present invention.

Now one preferred embodiment of the means for recognition according to the present invention will be described with reference to FIG. 12.

In the first place, the shape pattern of an article P subjected to pattern recognition is read out by means of a pattern input unit by having an initial postural angle $\theta_1$ arbitrarily set therein. As the pattern input unit, there may be adopted, for example, an ITV camera whereby the outputs at the individual sample points on the scanning lines are converted by an AD converter into corresponding binary signals representing said sample points in terms of magnitude of optical brightness or a bank of a multiplicity of small sensors whereby the shape pattern desired to be recognized is detected in the form of binary signals.

By the arithmetic operation performed in the pattern recognizing unit, the shape pattern of the article detected in the pattern input unit is converted into a perpendicular projection, on the basis of which the area A, the largest width Ax and the largest height Ay of said article at the initial postural angle $\theta_1$ are determined and consequently the pattern-classification value S is computed in accordance with the formula (1).

The detection of the shape pattern and the computation of the pattern-classification value just described will be likewise carried out at a second postural angle $\theta_2$ (= $\theta_1 + \Delta\theta$) to which said article has been rotated by a given incremental angle $\Delta\theta$ from said initial postural angle $\theta_1$. The procedure is repeated while the postural angle of the shape pattern is increased from 0° to 180° by rotating the article. Consequently, there will be obtained the variations in the pattern-classification value due to the change of the postural angle $\theta$ in the range of from 0° to 180° and, consequently, the maximum range of variation $\Delta S$ and the average $\overline{S}$ of the pattern-classification value S.

Figure 13:
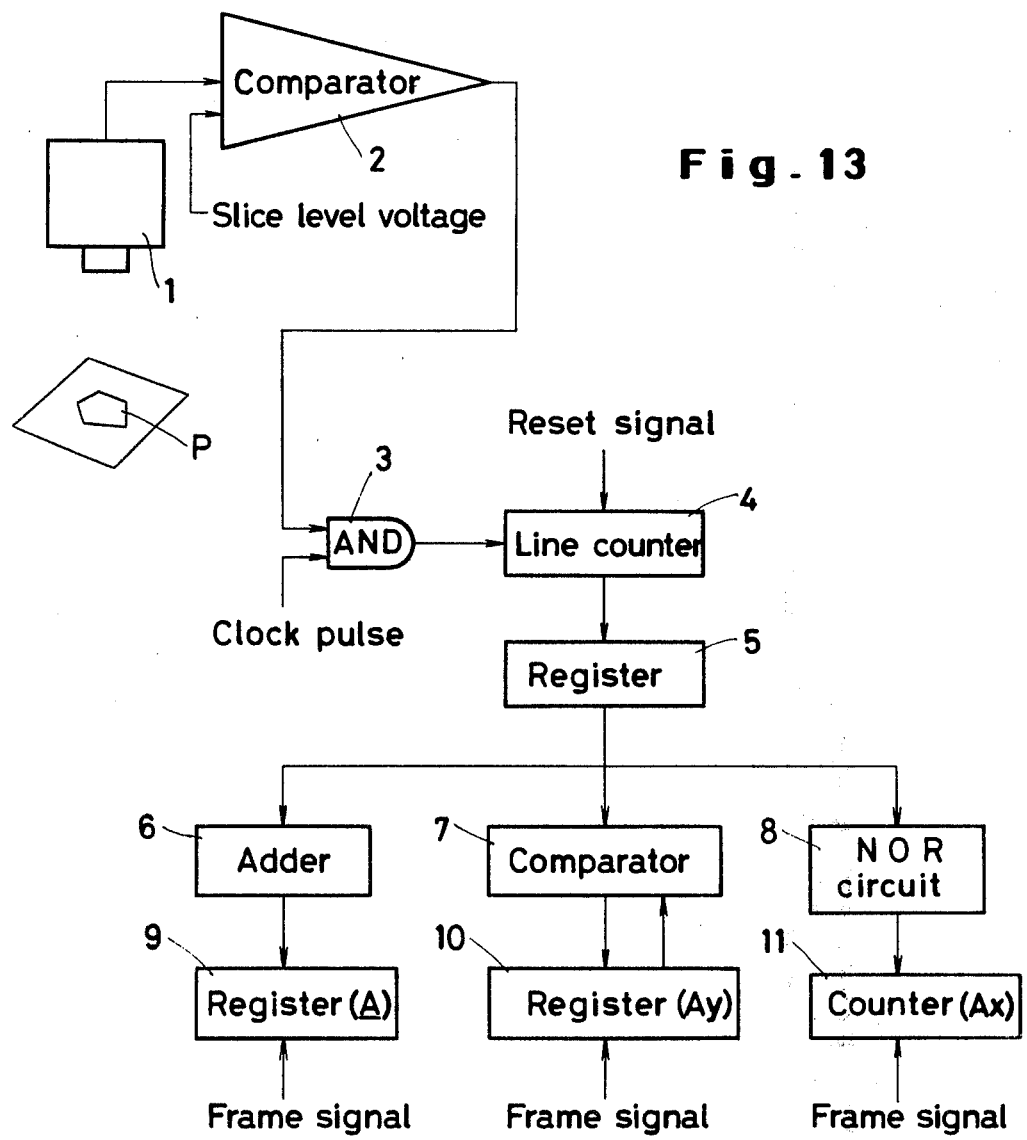
FIG. 13 is a block diagram of a circuit for obtaining pattern-classification values according to the present invention.

One embodiment of the operation described above will be described with reference to FIG. 13. A direct projection of an article P subjected to pattern recognition is photographed at a certain postural angle by an ITV camera 1. The projection is converted into a video signal which is forwarded to a comparator 2. In the comparator 2, the voltage of this video signal is compared with the slice level voltage set in advance, with the difference subjected to binary conversion on condition that any surplus over said level voltage indicated as 1 and any shortage as 0 respectively. An AND circuit 3 forwards clock pulses to a line counter 4 only when the binary signal received from the comparator 2 is 1. The line counter 4 takes a count of the number of clock pulses in one scanning line and transmits the number found to a register 5. The count of the clock pulses in one scanning line is delivered from the registor 5 to an adder 6, a comparator 7 and a NOR circuit 8.

In the adder 6, the counts of clock pulses per scanning line received sequentially from the register 5 are cumulatively added, with the gradually increasing sum committed to memory in a register 9. On the basis of the grand total of these counts of pulses, the area A of the article per frame of ITV photograph is obtained.

In the comparator 7, the number of pulses received from the register 5 is compared with the number of pulses already stored in the register 10. The number displayed in the register 10 is changed to the received number of pulses only when the received number of pulses is greater than the displayed number. By comparing the counts of pulses of individual component scanning lines as described above, the largest count of pulses in each frame of the ITV photograph is determined, with the result that the largest height Ay of the article is detected.

In the NOR circuit 8, only the number of scanning lines that have given counts of pulses is forwarded to a counter 11 to indicate the grand total of counts of scanning lines per frame of ITV photograph. On the basis of this grand total of scanning lines, the largest width Ax of the article per frame of ITV photograph is determined.

After the area A, the largest width Ax and the largest height Ay of the article at the postural angle $\theta$ have been obtained as described above, the register 9, the register 10 and the counter 11 are reset by means of a frame pulse and either the ITV camera or the article itself is rotated by a fixed incremental angle $\Delta\theta$. The area A, the largest width Ax and the largest height Ay of the article at the newly assumed postural angle $\theta + \Delta\theta$ are obtained by the same procedure. The computation of the pattern-classification value S of the article is completed when the determination of the area A, the largest width Ax and the largest height Ay of the article has been accomplished on all the frames of the ITV photograph taken by varying postural angles of the article as the article is rotated by 180°.

The accuracy of said pattern-classification value increases as smaller incremental postural angles are selected in rotating the article during the photography. Usually, an incremental angle of about 5° will suffice for the desired accuracy of determination.

Figure 14:
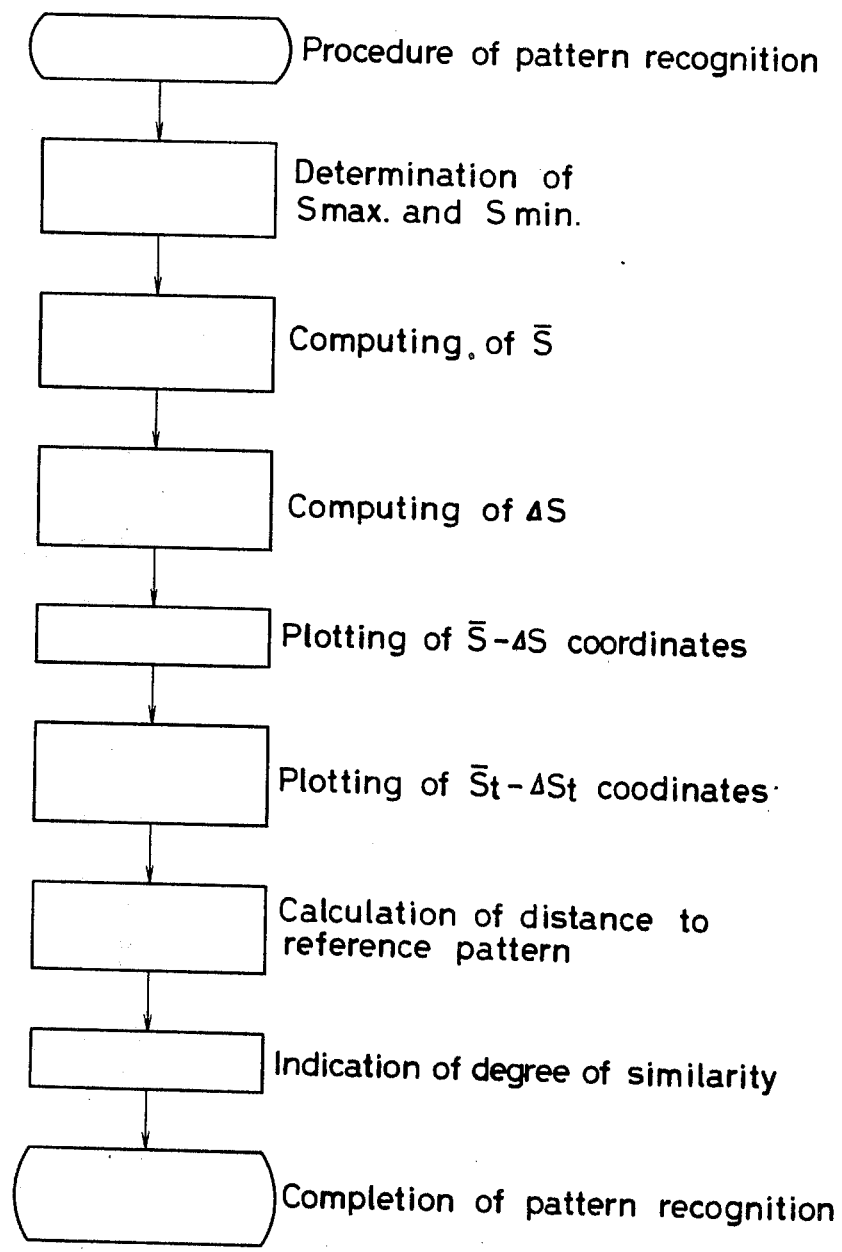
FIG. 14 is a block diagram of a circuit for performing pattern recognition on the basis of pattern-classification values according to the present invention.

Then, as illustrated in FIG. 14, the procedure for the recognition of a similar reference pattern comprises finding the maximum, $S_{max}$, and the minimum, $S_{min}$, from the pattern-classification values determined for the varying frames of photograph taken by having the article rotated from 0° to 180° and determining the average $\bar{S}$, and the maximum range of variation, $\Delta S$ from said maximum $S_{max}$ and minimum $S_{min}$.

The locus determined by the average $\bar{S}$ of the pattern-classification value and the maximum range of variation $\Delta S$ obtained as described above is plotted in the prescribed S - $\Delta S$ coordinate system. When necessary, the $\bar{S}$ - $\Delta S$ coordinates thus obtained are converted into an $\bar{S}t$ - $\Delta St$ coordinate system set in advance in accordance with a desired sense filter. The degrees of similarly of the article to the various reference patterns is, then, found by computing the respective distances from the locus of the article to the reference pattern in accordance with the formula (2). The degrees of similarity are displayed by proper means and the approximate shape of the article can be recognized.

Instead of having the loci determined by the average $\bar{S}$ of pattern-classification value and the range of variation $\Delta S$ plotted in the $\bar{S}$ - $\Delta S$ coordinate system, the desired pattern recognition can be accomplished by the procedure illustrated in FIG. 15. The first step of the procedure consists in deciding whether or not the range of variation $\Delta S$ is zero or not. If the range of variation is zero and consequently the average $\bar{S}$ is equal to the pattern-classification value S, then the subsequent step is to compare said average $\bar{S}$ with the pattern-classification value $S_3$ for a triangle. If they are found to be equal, then the article is recognized to be a triangle. If they are not equal, the average $\bar{S}$ is compared sequentially with the pattern-classification value $S_5$ for a regular pentagon, that $S_6$ for a regular hexagon, that $S_7$ for a regular heptagon and that $S_c$ for a circle. If the range of variation $\Delta S$ is found not be zero, then the range of variation $\Delta S$ is compared with the range of variation for a square $\Delta S_4$ and than that for a regular octagon $\Delta S_8$. If equality is found to exist between the article and either of the patterns, the article in question is recognized to have that particular pattern.

If in this case the pattern-classification values $\bar{S}$ for the various reference patterns and their respective range of variation $\Delta S$ are each given a prescribed width, such as a width of 0.5 – 0.62 to the pattern-classification value for triangles, 0 – 0.15 to the range of variation thereof, 0.6 – 0.8 to the pattern-classification value for squares, 0.35 – 0.5 to the range of variation thereof, and 0.63 – 0.72 to the pattern-classification value for pentagons and 0 – 0.1 to the range of variation thereof, for example, then recognition can be obtained approximately to find the particular pattern to which the article bears the greatest degree of similarity.

This principle of approximate recognition of the shape of a given article can be applied to classification of industrial parts, packages and so on.

As described in detail above, the method of recognition according to the present invention comprises determining the pattern-classification values of the given article, the average of said pattern-classification values and the maximum range of variation and comparing the resultant data with the corresponding data of reference patterns. The stored reference pattern data need only be of a small volume and the apparatus employed for handling these data is required to have only a very simple structure. Even if a given article subjected to pattern recognition fails to conform with any of the reference patterns, there still can be obtained the degree of similarity of the shape of that article to each of the reference patterns. Thus, this invention far excels the conventional methods of pattern recognition and can extensively be utilized for the purpose of sorting and classifying industrial parts, packages, containers, etc. in terms of pattern.

What is claimed is:

1. A method for the recognition of the approximate shape of an article, which comprises finding from the projection of said article the largest width, the largest height and the area of the article relative to a reference line, measuring a pattern-classification value obtainable from the ratio of the area found to the product of said largest width multiplied by said largest height while rotating the postural angle of the article by 180°, calculating the average value and the maximum range of variation from the pattern-classification value measured in consequence of said 180° rotation, integrally comparing the resulting average pattern-classification value and maximum range of variation with the average pattern-classification values and maximum ranges of variation of a desired number of reference patterns and consequently determining the degree of similarity of the shape with the relevant reference pattern.

2. The method according to claim 1, wherein the average pattern-classification value is the average of the maximum pattern-classification value and the minimum pattern-classification value determined by the measurement accomplished through the rotation of the article by 180°.

3. The method according to claim 1, wherein the average pattern-classification values of reference patterns and corresponding range of variation are each given a prescribed range so that the shape of the article subjected to pattern recognition is recognized to be identical with or similar to any of said reference patterns by virtue of the fact that the average pattern-classification value and range of variation of said article belong within said prescribed ranges of the average pattern-classification value and range of variation of that particular reference pattern.

4. The method according to claim 1, wherein locus determined by the average pattern-classification value and the maximum range of variation obtained of the article is plotted in a coordinate system having the average pattern-classification values and the maximum ranges of variation of a given number of reference patterns plotted in advance therein and the degrees of similarity of the article to said reference patterns are determined on the basis of the distances of the locus of the article to the various loci of said reference patterns.

5. The method according to claim 4, wherein the coordinate system is converted through the medium of a desired sense filter.

6. The method according to claim 5, wherein the coordinate system uses the reference patterns of a triangle, a square and a circle and said reference patterns have been converted through the medium of a sense-filter so that said reference patterns of the triangle, the square and the circle will not have similarity with one another.

7. The method according to claim 5, wherein the conversion of the coordinate system has been made so that the coefficient of conversion for the horizontal coordinate is $\alpha$ (average pattern-classification value $-0.5)^{1.5}$ and that for the vertical coordinate is $\beta$ (maximum range of variation)$^{0.9}$.

8. The method according to claim 1, wherein the area of the article is determined by converting the projection of the article into a corresponding video signal for thereby generating clock pulses corresponding to the shape of the article, taking a count of clock pulses for each of the scanning lines, finding the grand total of clock pulses per frame of the photograph and computing the area on the basis of said grand total of clock pulses.

9. The method according to claim 1, wherein the largest height of the article relative to the reference line is determined by converting the projection of the article into a corresponding video signal for thereby generating clock pulses corresponding to the shape of the article, comparing the clock pulses of the individual scanning lines in one frame of photograph to find the largest number of clock pulses generated in a single scanning line and computing said largest height on the basis of said largest number of clock pulses.

10. The method according to claim 1, wherein the largest width of the article relative to the reference line is determined by converting the projection of the article into a corresponding video signal for thereby generating clock pulses corresponding to the shape of the article, finding the total number of scanning lines generated in one frame of photograph and computing said largest width on the basis of said total number of scanning lines.

11. The method according to claim 1, wherein the area of the projection of the article is determined by causing the image of the article to be drawn on a bank of arrayed minute sensors, counting the number of those of said sensors on which the image has been drawn and computing said area on the basis of the number found.

12. The method according to claim 11, wherein the largest height and the largest width of the projection of the article are determined by counting, in those of the bank of arrayed minute sensors falling within the image of the article, the number of sensors contained in the longest one of the rows of sensors and the number of sensors obtained in the longest one of the columns of sensors respectively.

13. The method according to claim 11, wherein the largest height, the largest width and the area of the article are determined at the varying postural angles which the article assume relative to the bank of arrayed minute sensors as the bank is rotated successively by a fixed incremental angle up to a total of 180°.

14. An apparatus for the recognition of the approximate shape of an article, which comprises, in combination, means for registering the image of an article subjected to pattern recognition while causing the postural angle of the article to be rotated in the range of from 0° to 180°, means for measuring the largest width, the largest height and the area of the article relative to a reference line from each of the projections of the article obtained while having the article successively rotated at a fixed incremental angle up to 180°, means for computing the pattern-classification value obtainable from the ratio of the area to the product of the largest width multiplied by the largest height while the largest width, the largest height and the area of the article are measured at each of said varying postural angles, means for determining the average pattern-classification value and the maximum variable range from the pattern-classification values obtained at said varying postural angles of the article, and means for comparing said average pattern-classification value and maximum range of variation of the article with the average pattern-classification values and maximum ranges of variation of a desired number of reference patterns and thereby determining the degrees of similarity of the article to said reference patterns.

15. The apparatus according to claim 14, wherein said means for determining the degrees of similarity of the article to the reference patterns comprises means for plotting the locus determined for the article by virtue of the average pattern-classification value and the maximum range of variation in a coordinate system having plotted therein a desired number of reference patterns, with the vertical coordinate representing the maximum range of variation and the horizontal coordinate representing the average pattern-classification value respectively.

16. The apparatus according to claim 15, wherein the coordinate system has undergone conversion through the medium of a desired sense filter.

17. The apparatus according to claim 14, wherein said means for measuring the area, the largest width and the largest height of the article from the perpendicular projections of said article comprises means for converting the direct projections of the article into corresponding video signals, means for generating the clock pulses corresponding to the pattern of the article, means for counting the total of clock pulses generated per frame of photograph, means for comparing the numbers of clock pulses generated for the componenet scanning lines of said frame of photograph for thereby finding the largest one of said numbers of clock pulses, and means for counting out of all the total of scanning lines falling within said one frame of photograph, the number of those particular scanning lines which contain clock pulses.

* * * * *